United States Patent [19]
Bottomley

[11] 3,954,164
[45] May 4, 1976

[54] HIGH FREQUENCY LOADER ASSEMBLY

[75] Inventor: Herbert G. Bottomley, Skipton, England

[73] Assignee: Landis Lund Limited, Keighley, England

[22] Filed: July 28, 1975

[21] Appl. No.: 599,904

[52] U.S. Cl. .............................. 198/27; 198/107; 51/103 WH; 51/215 H; 214/1 BD
[51] Int. Cl.² ........................................ B65G 47/00
[58] Field of Search............. 198/22 R, 24, 27, 107; 214/1 B, 1 BC, 1 BD; 51/103 WH, 215 R, 215 AR, 215 CP, 215 H, 215 UE, 230, 234, 165.9; 82/207

[56] References Cited
UNITED STATES PATENTS

| | | | |
|---|---|---|---|
| 2,864,209 | 12/1958 | Balsiger | 51/215 H |
| 3,073,074 | 1/1963 | Price | 51/215 AR |
| 3,501,870 | 3/1970 | Bottomley | 198/107 X |
| 3,575,320 | 4/1971 | Cafolla | 214/1 BD |
| 3,640,026 | 2/1972 | Flanigan | 214/1 BD X |
| 3,863,402 | 2/1975 | Price | 51/215 H |
| R24,885 | 10/1960 | Narel et al. | 51/215 CP |

FOREIGN PATENTS OR APPLICATIONS

| | | | |
|---|---|---|---|
| 623,826 | 8/1961 | Italy | 214/1 BD |
| 433,906 | 10/1967 | Switzerland | 82/2.7 |
| 46,423 | 4/1972 | Japan | 82/2.7 |

*Primary Examiner*—Evon C. Blunk
*Assistant Examiner*—Richard K. Thomson
*Attorney, Agent, or Firm*—Spencer T. Smith

[57] ABSTRACT

A loader assembly for use with a machine tool comprising a drum-shaped carrier including a plurality of equispaced workpiece receiving recesses, means for selectively indexing the drum-shaped carrier, a workloading chute including means for sequentially advancing a plurality of workpieces to a selected one of the plurality of carrier recesses, and a loader mechanism including a housing supporting a pair of rams having gripper means at one end thereof, means for selectively displacing the rams intermediate retracted and advanced positions, the rams being selectively angularly related so that the center points of the gripper elements coincide at the advanced ram positions, and means for selectively displacing the gripper elements intermediate open and gripping positions, and means for selectively pivotally displacing the housing from a first position, whereat the coincident center points coincide with the centerline of the stocks of the machine tool to a second position, whereat the coincident center points coincide with the center of a second one of the equispaced carrier recesses.

3 Claims, 1 Drawing Figure

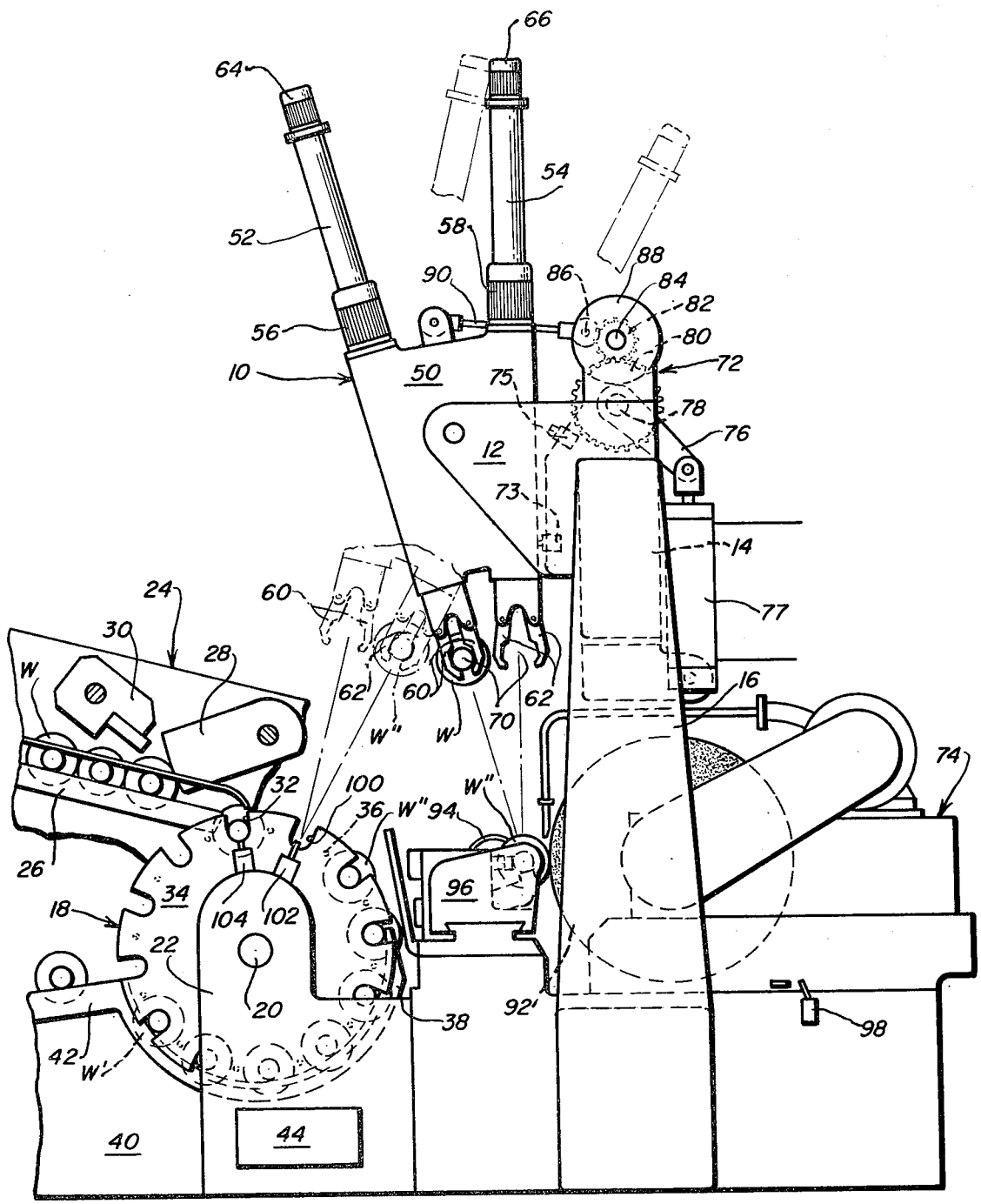

HIGH FREQUENCY LOADER ASSEMBLY

The present invention relates to automatic loader assemblies for machine tools such as cylindrical grinders, and more particularly to loader assemblies which include a loader mechanism movable along a gantry from a pickup station to a loading station. Gantry loaders occupy a great deal of space and their cycle time is very substantial due to the distances which must be traversed. Gantry loaders can therefore only be effectively utilized if the time required to machine a workpiece is greater than the cycle time of the loader.

It is accordingly an object of the present invention to provide a loader assembly which has a very short cycle time so that it can be utilized in high frequency applications.

Other objects and advantages of the present invention will become apparent from the following portion of this specification and from the accompanying drawing which illustrates in accordance with the mandate of the patent statutes a presently preferred embodiment incorporating the principles of the invention.

Referring to the drawing:

The sole drawing comprises an elevational view of a loader assembly made in accordance with the teachings of the present invention.

The loader assembly includes a loader mechanism 10 pivotally mounted on forwardly extending brackets 12 of a cross member 14 which is supported by a pair of standards 16, an indexing drum carrier 18 rotatably mounted on an axle 20 which is supported by opposed pillar blocks 22, and a workloading chute 24.

A number of like workpieces W are received between a pair of spaced rails 26 of the workloading chute and are sequentially located against a stop member 28. The stop member 28 which is connected via a linkage (not shown) to an escapement member 30 is elevated by the advancement of a hydraulic cylinder (also not shown) thereby permitting the forward workpiece to gravitationally roll down the rails 26 and into an empty workpiece receiving and supporting recess 32 defined by opposing notches in the parallel disc-shaped side walls 34 of the drum carrier. The escapement member 30 is concurrently lowered to prevent the remaining workpieces from rolling down the rails. The carrier walls 34 are rigidly supported by a plurality of spacing rods 36 and the carrier recesses are equispaced. Reference may be had to U.S. Pat. No. 3,863,402 for a more detailed discussion of the workloading chute.

The carrier 18 includes a guide track 38 which is supported by the carrier bed 40 and which extends approximately 180° about the carrier to hold finished workpieces W'' in the carrier until they reach a discharge chute 42. The carrier may be indexed by an indexing mechanism diagrammatically illustrated at 44, which may be of the type disclosed in detail in U.S. Pat. No. 3,073,074.

The loader mechanism includes a housing 50 which supports a pair of rams 52, 54. These rams are selectively displaceable intermediate retracted (illustrated) and advanced positions by suitable motors 56, 58. Each ram includes a pair of work gripping fingers 60, 62, which are selectively displaceable intermediate open and closed (gripping) positions by means of gripper motors 64, 66. The center points 70 of the gripper fingers 60, 62, coincide at the advanced position of the rams.

The loader assembly additionally includes a mechanism 72 for pivoting the housing 50 from a first position which is confirmed by the closing of a first loader switch 73, where the loader mechanism can deposit unground workpieces at and remove finished workpieces from the grinding station of a cylindrical grinder 74, to a second position (partially illustrated in phantom), which is confirmed by the closing of a second loader switch 75, where finished workpieces can be deposited in and unground workpieces can be removed from the work carrier. The loader assembly pivoting mechanism 72 may, for example, include a hydraulic cylinder 77, which is linked via an arm 76 to a rotatable shaft 78. A gear 80 keyed to this shaft drives a pinion 82, suitably mounted on a parallel shaft 84, to rotatably dsiplace a crankpin 86 mounted on a disc 88, which is also secured to the second shaft. The displacement of the crankpin reciprocates a connecting rod 90, and hence, the loader mechanism between the first and second positions.

A workpiece W'' which is rotatably driven by the cylindrical grinder in a conventional manner is machined to finish size by a selectively advanceable grinding wheel 92. When size is reached, a sizing gage including a sizing finger 94 initiates an electrical circuit which retracts the workrest 96 and grinding wheel 92.

As the grinding wheel retracts, a switch 98 is tripped to energize the right-hand ram motor 58. The right-hand ram 54 is fully advanced with open gripping elements to the grinding station whereupon a switch (not shown) is closed to stop the right ram motor 58 and to actuate the right-hand gripper motor 66 to close the gripping fingers. As the gripping fingers engage the finished workpiece, a switch (not shown) is tripped to stop the right-hand gripper motor 66 to open the head and foot stocks (not shown) of the cylindrical grinder to release the finished workpiece and to energize the right-hand ram motor 58 to retract the right-hand ram 54 with the finished workpiece W''.

When the right-hand ram 54 reaches its raised position, a switch (not shown) is tripped stopping the right-hand ram motor 58 and energizing the left-hand ram motor 56 to advance the left-hand ram 52 which supports a green or unground workpiece W to the grinding station. The advanced left-hand ram actuates a switch (not shown) which stops the left-hand ram motor 56 and advances the head and foot stocks to engage the workpiece. When the workpiece is engaged by the head and foot stocks, a switch (not shown) is closed to energize the left-hand gripper motor 64 to open the left-hand gripping fingers 60. A switch (not shown) is then energized to stop the left-hand gripper motor 64 and to actuate the left-hand ram motor 56 to retract the left-hand ram 52. The grinding wheel 92 will then be advanced to effect stock removal.

As the grinding wheel 92 advances, the grinder switch 98 is opened to actuate the hydraulic cylinder 77 to pivotally displace the loader mechanism 10 from the first position to the second position. The second loader switch 75 is closed to actuate the right-hand ram motor 58 to advance and deposit the ground workpiece W'' in a finished workpiece receiving recess 100 of the drum carrier thereby energizing a switch (not shown) to stop the right-hand ram motor 58 and to energize the right-hand gripper motor 66 to open the right-hand gripping fingers 62. The finished workpiece W'' is thereby released. A trip switch 102 confirms the presence of a finished workpiece in the recess. The opened right-hand gripper fingers 62 generate a signal to stop the right-hand gripper motor 66 and to actuate the right-hand ram motor 58 to retract the right-hand ram 54.

When the right-hand ram 54 is fully retracted, the carrier indexing mechanism will be energized to index the carrier if the presence of an unground workpiece W in the unground workpiece receiving notch 32 is confirmed by a part present switch 104. The left-hand ram motor 56 will then be energized to fully advance the left-hand ram with open gripping fingers. The gripping fingers 60 of the advanced left-hand ram will then be closed to grip the unground workpiece, the left-hand ram 52 will be fully retracted, the loader mechanism housing will be returned to its first position, and the workloading cylinder will be retracted to complete the cycle.

What I claim is:

1. A loader assembly for use with a machine tool comprising
    a drum-shaped carrier including a plurality of equispaced workpiece receiving recesses,
    means for selectively indexing said drum-shaped carrier,
    a workloading chute including means for sequentially advancing a plurality of workpieces to a selected one of said plurality of carrier recesses, and
    a loader mechanism including
        a housing including
        a pair of rams having gripper means at one end thereof,
        means for selectively displacing said rams intermediate retracted and advanced positions, said rams being angularly related so that the center points of said gripper elements coincide at the advanced ram positions, and
        means for selectively displacing said gripper means intermediate open and gripping positions, and
    means for selectively pivotally displacing said housing from a first position whereat said coincident center points coincide with the center line of the stocks of the machine tool to a second position whereat said coincident center points coincide with the center of a second one of said equispaced carrier recesses.

2. A loader assembly according to claim 1, wherein said drum-shaped carrier further comprises
    means for confirming the presence of an unground workpiece in said one carrier recess, and
    means for confirming the presence of a finished workpiece in said second carrier recess.

3. A loader assembly according to claim 1, wherein said loader mechanims further comprises
    means for confirming that said housing is at said first position, and
    means for confirming that said housing is at said second position.

* * * * *